(12) United States Patent
Liu

(10) Patent No.: US 7,545,637 B2
(45) Date of Patent: Jun. 9, 2009

(54) SUPPORTING FRAME FOR NOTEBOOK COMPUTER

(76) Inventor: Jan-Ban Liu, 235 Chung-Ho Box 8-24, Taipei (TW)

( * ) Notice: Subject to any disclaimer, the term of this patent is extended or adjusted under 35 U.S.C. 154(b) by 56 days.

(21) Appl. No.: 11/872,041

(22) Filed: Oct. 15, 2007

(65) Prior Publication Data

US 2009/0097198 A1   Apr. 16, 2009

(51) Int. Cl.
*H05K 7/20* (2006.01)
*H01H 5/00* (2006.01)

(52) U.S. Cl. .................. 361/687; 361/683; 361/695

(58) Field of Classification Search ............ None
See application file for complete search history.

(56) References Cited

U.S. PATENT DOCUMENTS 5,749,306 A * 5/1998 Breuner ............... 108/44
6,256,193 B1 * 7/2001 Janik et al. ............ 361/683
7,293,751 B2 * 11/2007 Eriksson ............. 248/346.01
7,333,327 B1 * 2/2008 Ho et al. .............. 361/683
2004/0007649 A1 * 1/2004 Vettraino ............. 248/127
2006/0192070 A1 * 8/2006 Chan ................. 248/371

* cited by examiner

Primary Examiner—Boris L Chervinsky

(57) ABSTRACT

A supporting frame for a notebook computer comprises a seat having a hollow post for screwing with a screw; the seat having two retainers at a rear side of an upper surfaces thereof; each retainer having a shaft; two retaining recesses being formed at a front end of the upper surface of the seat; each retaining recess having a retaining shaft; each retaining shaft being hooked by a hook of a push unit; two positing racks installed at two sides of an upper surface of the seat; an upper side of each positing rack having a plurality of rack recesses; an outer side of each positing rack being installed with a positioning bar; and a supporting plate having two buckling shafts at two front ends thereof; the buckling shafts being buckled to the positing racks so as to retain the supporting plate to the seat.

3 Claims, 6 Drawing Sheets

SUPPORTING FRAME FOR NOTEBOOK COMPUTER

FIELD OF THE INVENTION

The present invention relates to notebook computers, and particularly to supporting frame for a notebook computer, wherein by adjusting relative positions of buckling shafts of a supporting plate to the rack recesses of the positing racks, the angle between the supporting shafts and the seat is adjusted. A fan installed to the supporting plate blows air to a bottom of a notebook computer for heat dissipation, A rotary disk is installed to the bottom of the supporting plate so as to adjust the orientation of a notebook computer installed on the supporting plate.

BACKGROUND OF THE INVENTION

With the improvement of technology, the size of the notebook computer is made smaller and smaller. Furthermore advantages of the notebook computer are that it can be carried out conveniently and occupies a small space. However, in use, the bottom of the notebook computer is completely contacts with the table surface so that heat from the notebook computer cannot be removed. As a result, the computer will be overheated so that some parts are destroyed and the notebook computer cannot work normally. Moreover, in arrangement, the notebook computer is positioned with a specific angle with respective to the table surface. The angle cannot be adjusted as desired. This is not beneficial in exhibition.

SUMMARY OF THE INVENTION

Accordingly, the primary object of the present invention is to provide a supporting frame for a notebook computer, wherein by adjusting relative positions of buckling shafts of a supporting plate to-the rack recesses of the positing racks, the angle between the supporting shafts and the seat is adjusted. A fan installed to the supporting plate blows air to a bottom of a notebook computer for heat dissipation. A rotary disk is installed to the bottom of the supporting plate so as to adjust the orientation of a notebook computer installed on the supporting plate.

To achieve above objects, the present invention provides A supporting frame for a notebook computer, comprising a seat having a hollow post and the interior of the post being threaded for screwing with a screw; the seat having two retainers at two rear side sides of an upper surfaces thereof; each retain having a shaft; two retaining recesses being formed at a front end of the upper surface of the seat; each retaining recess having a retaining shaft; each retaining shaft being hooked by a hook of a push unit; two positing racks installed at two sides of an upper surface of the seat; an upper side of each positing rack having a plurality of rack recesses; an outer side of each positing rack being installed with a positioning bar; a supporting plate having two buckling shafts at two front ends thereof; the buckling shafts being buckled to the positing racks so as to retain the supporting plate to the seat; each of two opposite lateral sides of the supporting plate having a rod; each of two suspending shafts having a via hole at one end thereof; the rod being engaged to via hole so as to movably retain the supporting plate to the two supporting shafts; another end of the supporting shaft having a bucking recess; the supporting plate being formed with two net hole sets; a front end of the supporting plate being formed with a fan recess for buckling with a fan; by adjusting relative positions of the buckling shafts to the rack recesses of the positing racks, the supporting plate is retained to the positing rack.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
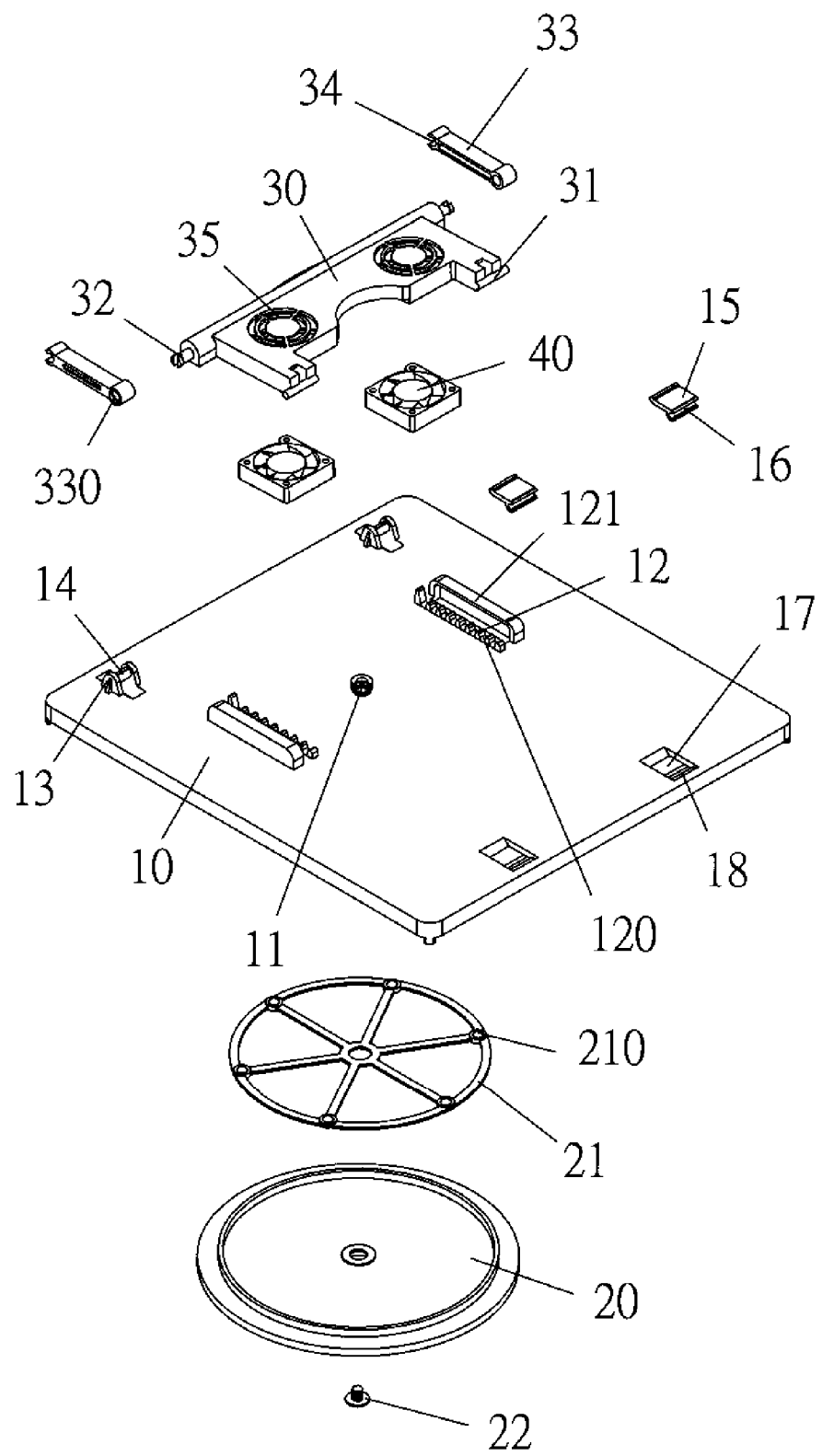
FIG. 1 is an exploded perspective view of the present invention.
Figure 2:
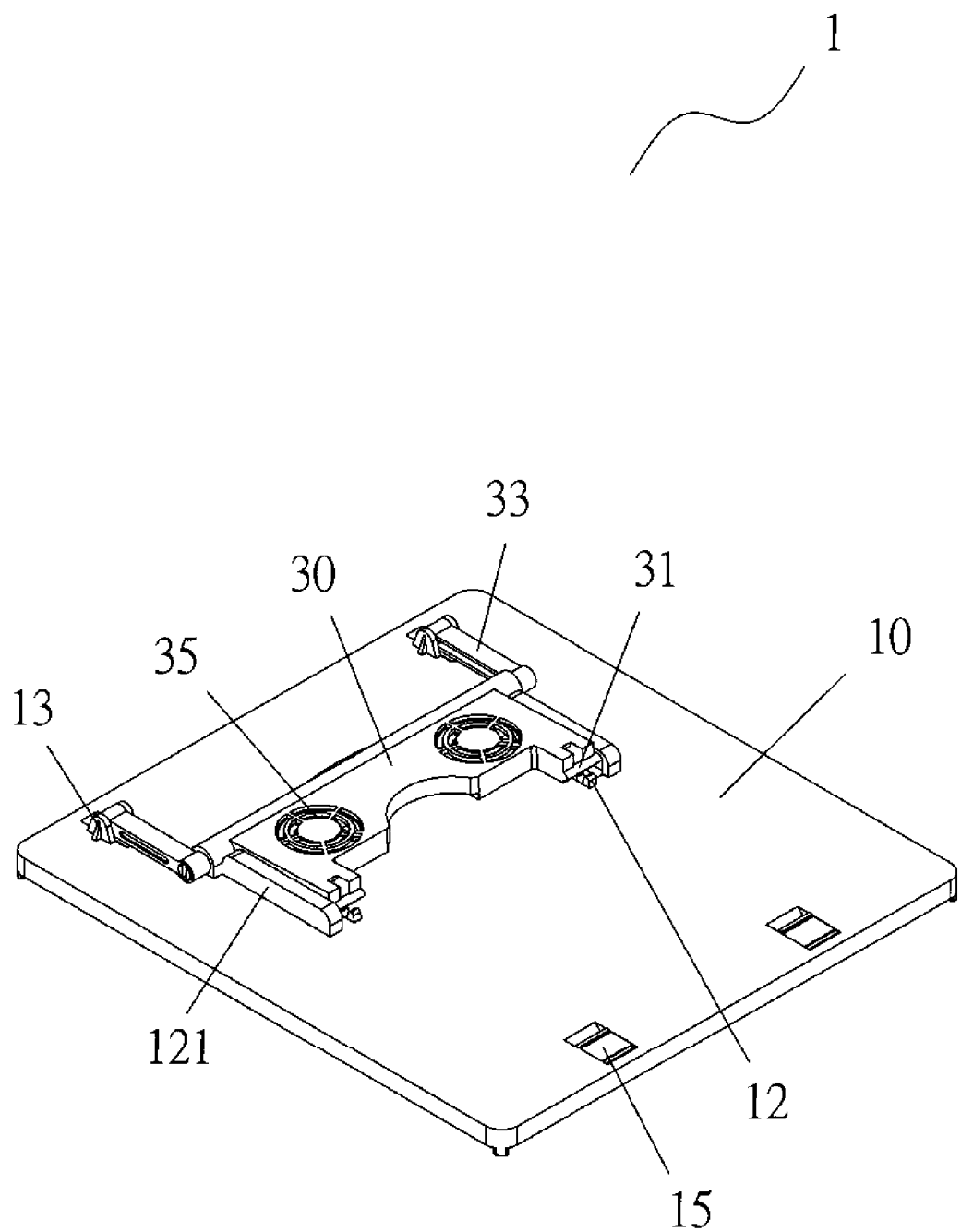
FIG. 2 is a schematic perspective view of the present invention.
Figure 3:
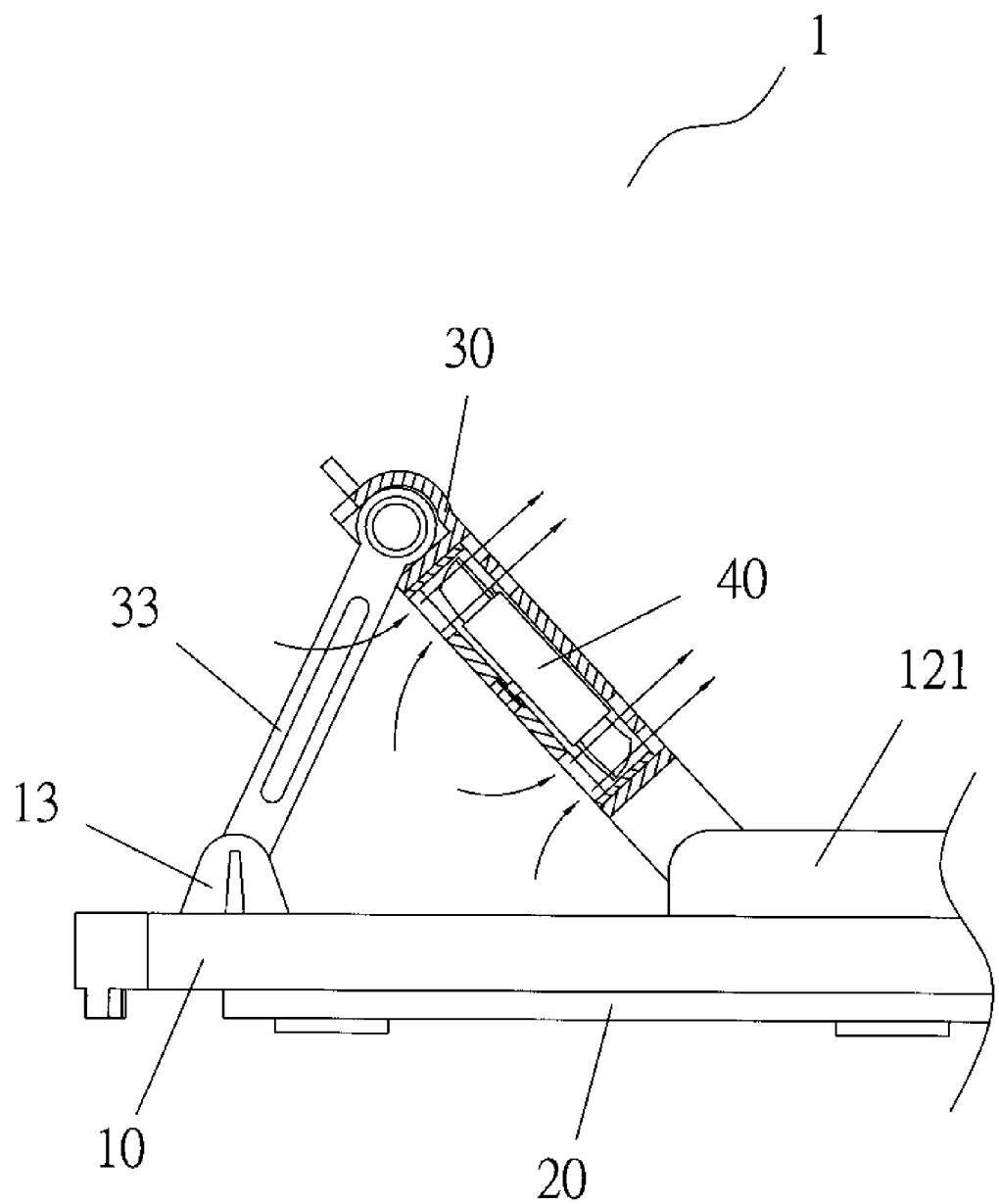
FIG. 3 is a lateral view of the present invention.
Figure 4:
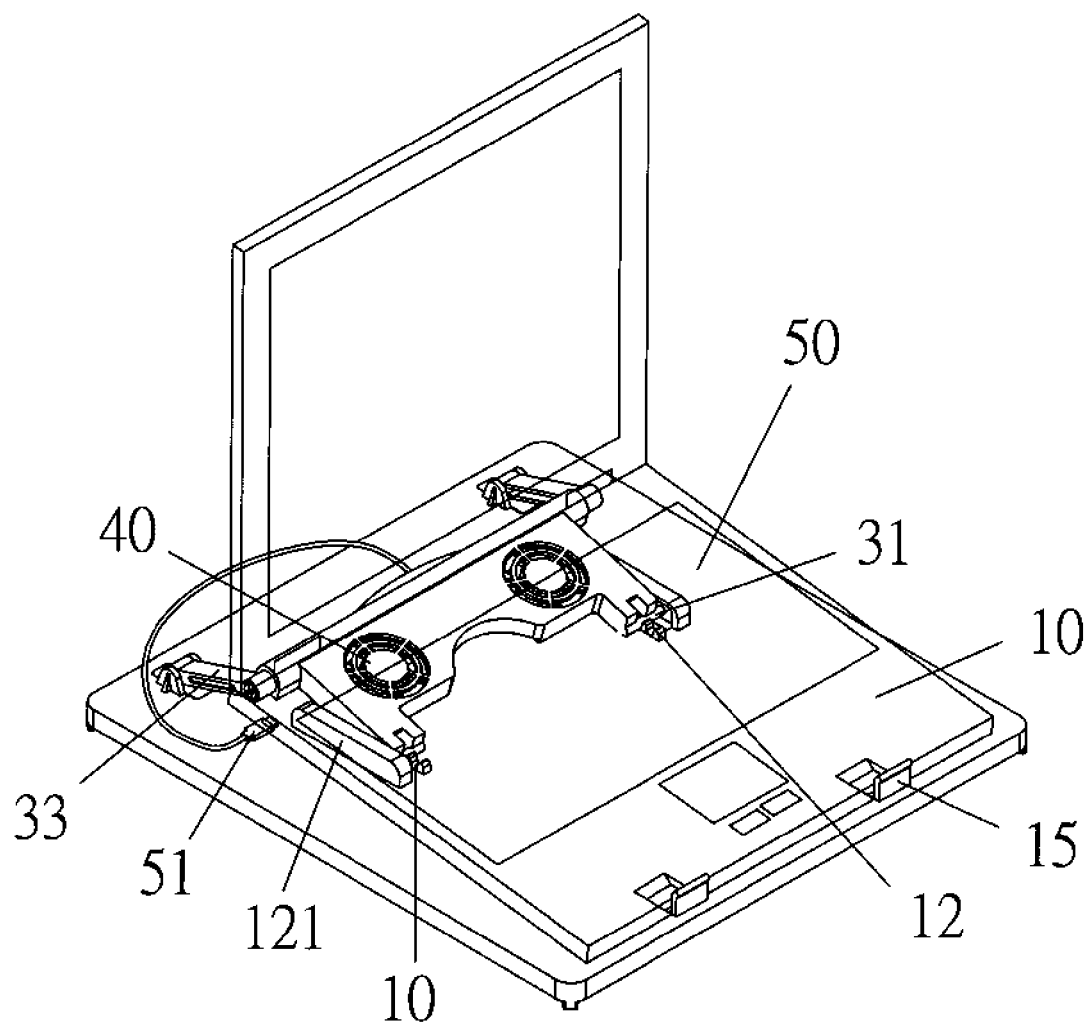
FIG. 4 shows one preferred embodiment of the present invention.
Figure 5:
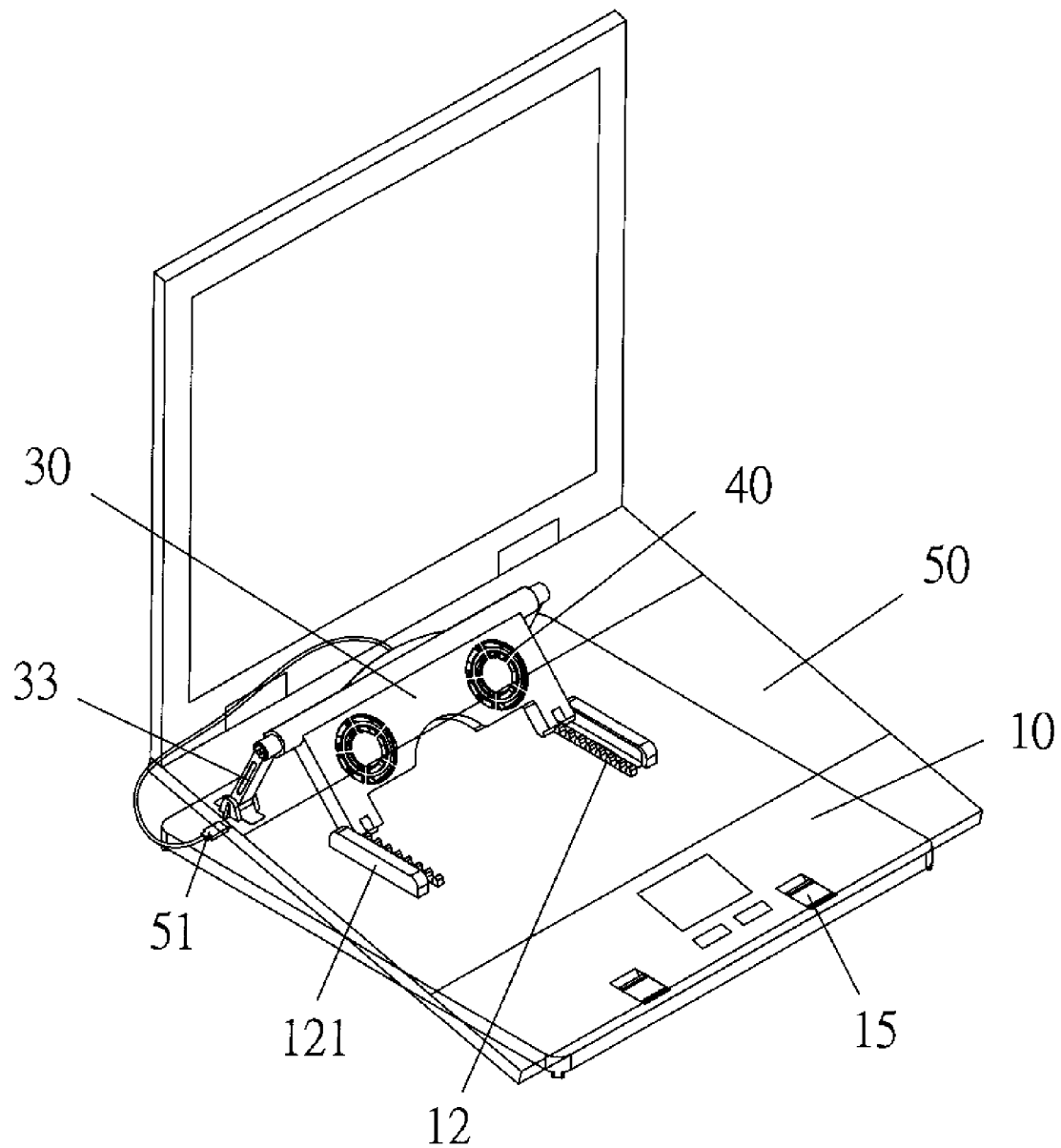
FIG. 5 shows another preferred embodiment of the present invention.
Figure 6:
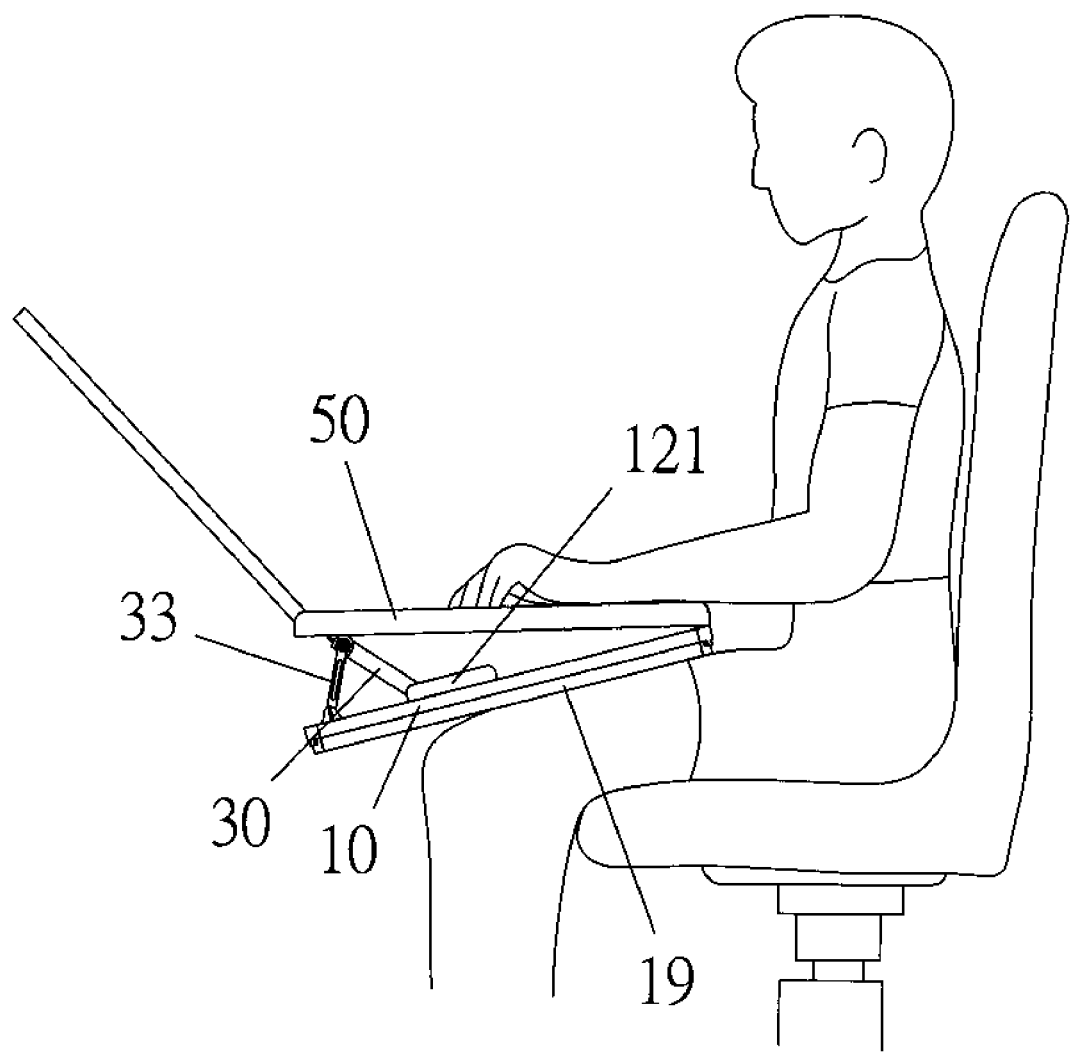
FIG. 6 shows a further preferred embodiment of the present invention.

With reference to FIGS. 1 and 2, the supporting assembly for a notebook computer according to the present invention is illustrated. The present invention has the following elements.

A seat 10 has a hollow post 11 and the interior of the post 11 is threaded for screwing with a screw. The seat 10 has two retainers 13 at a rear side of an upper surface thereof. Each retainer 13 has a shaft 14. Two retaining recesses 17 are formed at a front end of the upper surface of the seat 10. Each retaining recess 17 has a retaining shaft 18. Each retaining shaft 18 is hooked by a hook 16 of a push unit 15.

A rotary disk 20 is combined with a rotary wheel 21. The rotary wheel 21 is installed with a plurality of rolling balls 210. By using a screw 22 to pass through central holes of the rotary disk 20 and the rotary wheel 21 and then to be screwed to the post 11, the rotary disk 20 and the rotary wheel 21 are combined to the seat 10.

Two positing racks 12 are installed at two sides of an upper surface of the seat 10. An upper side of each positing rack 12 has a plurality of rack recesses 120. An outer side of each positing rack 12 is installed with a positioning bar 121.

A supporting plate 30 has two buckling shafts 31 at two front ends thereof. The buckling shafts 31 are buckled to the positing racks 12 so as to retain the supporting plate 30 to the seat 10. Each of two opposite lateral sides of the supporting plate 30 has a rod 32. Each of two suspending shafts 33 has a via hole 330 at one end thereof The rod 32 is engaged to via hole 330 so as to movably retain the supporting plate 30 to the two supporting shafts 33. Another end of the supporting shaft 33 has a buckling recess 34. The supporting plate 30 is formed with two net hole sets 35. A front end of the supporting plate 30 is formed with a fan recess for buckling with a fan 40. By adjusting relative positions of the buckling shafts 31 to the rack recesses 120 of the positing racks 12, the supporting plate 30 is retained to the positing rack 12.

With reference to FIGS. 3, 4, 5, and 6, by adjusting relative positions of the buckling shafts 31 to the rack recesses 120 of the positing racks 12, the angle between the supporting shafts 33 and the seat 10 is adjusted. The fan 40 blows air to a bottom of a notebook computer 50 for heat dissipation. The power of the fan 40 can be provided by a USB slot 51 to be connected to the notebook computer 50. In the present invention, the rotary disk 20 can be replaced by a pad 19 so that it can be placed on the legs of the user. Although this arrangement cannot adjust the angle. The push unit 15 can be pushed for retaining a small size notebook computer 50 so that the position of the fan 40 is adjusted to blow air to the bottom of the notebook computer 50 so as to have preferred efficiency.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A supporting frame for a notebook computer, comprising;
    a seat having a hollow post and an interior of the post being threaded for screwing with a screw; the seat having two retainers at a rear side of an upper surface thereof; each retainer having a shaft; two retaining recesses being formed at a front end of the upper surface of the seat; each retaining recess having a retaining shaft; each retaining shaft being hooked by a hook of a push unit;
    two positing racks installed at two sides of an upper surface of the seat; an upper side of each positing rack having a plurality of rack recesses; an outer side of each positing rack being installed with a positioning bar; and
    a supporting plate having two buckling shafts at two front ends thereof; the buckling shafts being buckled to the positing racks so as to retain the supporting plate to the seat; each of two opposite lateral sides of the supporting plate having a rod; each of two suspending shafts having a via hole at one end thereof; the rod being engaged with the via hole so as to movably retain the supporting plate to the two supporting shafts; another end of the supporting shaft having a buckling recess; the supporting plate being formed with two net hole sets; a front end of the supporting plate being formed with a fan recess for buckling with a fan; by adjusting relative positions of the buckling shafts to the rack recesses of the positing racks, the supporting plate is retained to the positing rack.

2. The supporting frame for a notebook computer as claimed in claim 1, further comprising:
    a rotary disk combined with a rotary wheel; the rotary wheel being installed with a plurality of rolling balls; by using a screw to pass through central holes of the rotary disk and the rotary wheel and then to be screwed to the post, the rotary disk and the rotary wheel are combined to the seat.

3. The supporting frame for a notebook computer as claimed in claim 1, further comprising a pad installed to a bottom of the seat.

* * * * *